May 22, 1951  C. H. WITTHOFFT  2,553,801
BEARING SEAL
Filed Dec. 2, 1946
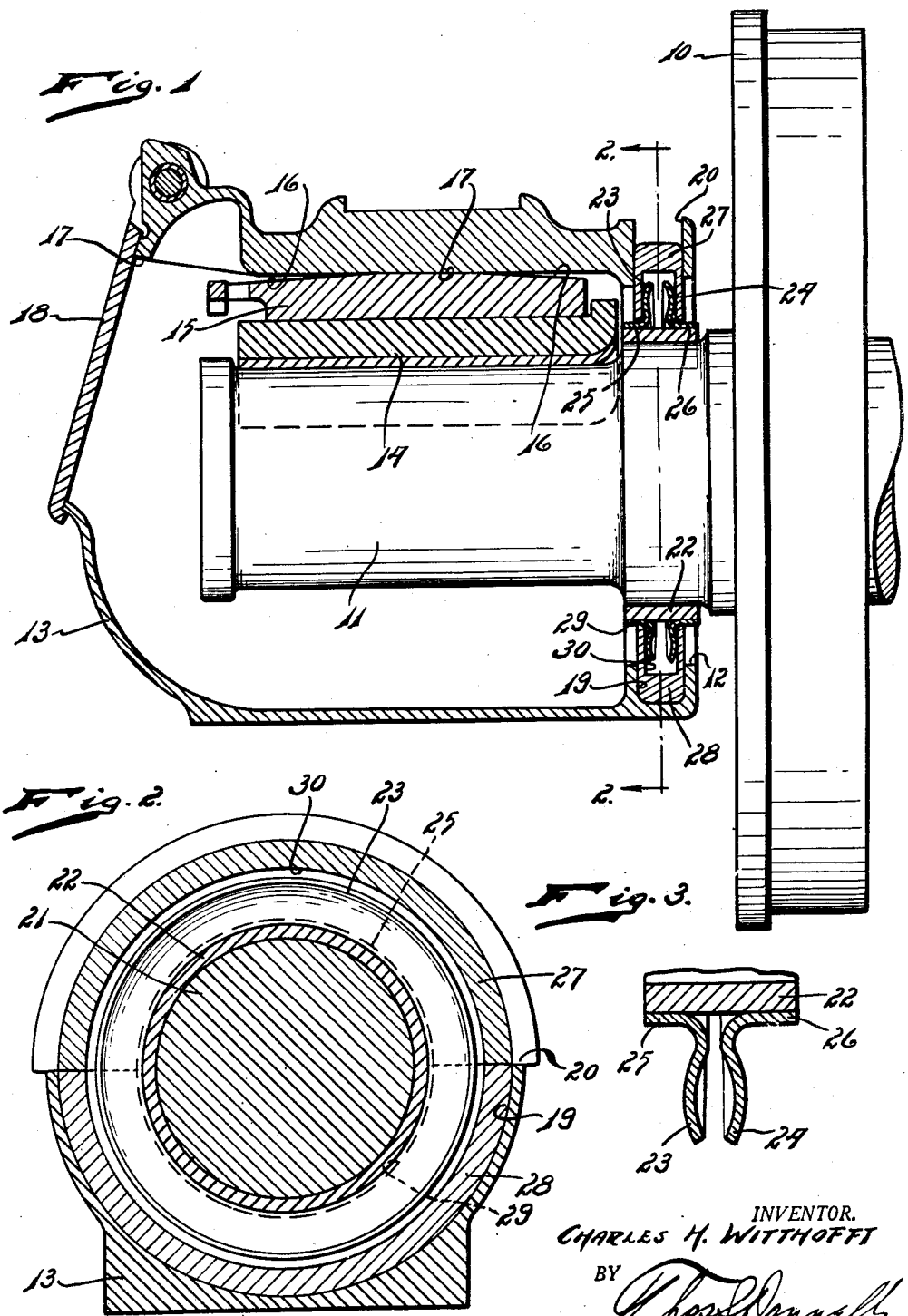
INVENTOR.
CHARLES H. WITTHOFFT
BY
Thos. J. Donnelly
ATTORNEY Patented May 22, 1951

2,553,801

UNITED STATES PATENT OFFICE 2,553,801

BEARING SEAL

Charles H. Witthofft, Detroit, Mich., assignor of one-half to Joseph F. Gohn, Grosse Ile., Mich.

Application December 2, 1946, Serial No. 713,418

3 Claims. (Cl. 286—6)

My invention relates to a new and useful improvement in a journal bearing seal for railway cars and the like.

In the present construction of journal boxes of railway cars now in use, there is provided a seal for sealing the opening of the box through which projects a rotating axle, bearing within the casing, which consists of a pair of wooden blocks held in a slot or recess formed laterally through the opening. The wooden blocks co-operatively embrace the shaft to seal the opening. This construction requires great accuracy in fitting of the blocks so that they closely embrace the shaft to prevent leakage or seepage of lubricant thereto from the casing and if the axle, at this point, is not true as to roundness, there cannot be an effective seal made with this type of block.

The present invention is adapted for use with this type of wooden block seal and can be readily mounted without necessitating any change or alteration in the present casing.

It is another object of the present invention to provide a seal whereby the lubricant within the journal box is prevented from seeping out through the shaft opening and thus, dirt and other foreign matter from entering through the shaft opening into the journal box.

It is still another object of the present invention to provide a seal which is economical of manufacture, easily and quickly installed and highly efficient in use.

Other objects will appear hereinafter.

It is recognized that various modifications and changes may be made in the detail of structure illustrated without departing from the invention itself and it is intended that such shall be embraced within the scope of the claims which form a part hereof.

Forming a part of this specification are drawings in which:

Fig. 1 is a central, vertical, cross-sectional view of a journal box and axle showing the invention applied, Fig. 2 is a sectional view taken on line 2—2 of Fig. 1, Fig. 3 is an enlarged fragmentary, cross-sectional view of the invention.

Shown in the drawings is a car wheel 10 mounted on axle 11 and rotated therewith. The axle 11 projects through opening 12 of journal casing or box 13 and is journaled in bearing 14 which is secured to plate 15 upon which rests the casing 13. The top of the plate 15 is provided with inclined surfaces 16 forming a crest 17 upon which the casing rests and this permits the casing to rock relative to the bearing 14 with the sway of the railway car without effecting any distortion of the bearing. Formed in the front of the casing is an inspection and filler opening 17 closed by a swingably mounted closure 18. Formed in the casing and extending laterally to intercept the opening 12 is a slot or recess 19, which extends through to form an opening 20 around the top of the casing. Secured to the shoulder 21 of axle 11 is a band 22 which may be either shrunk upon or welded to the axle. Carried by the bank 22 are a pair of discs 23 and 24 having their inner-peripheral edges 25 and 26 turned at right angles to the discs 23 and 24 to fit on the band 22 and be secured by weld, solder or the like. The discs 23 and 24 are of resilient material and are formed arcuate in cross-section. The discs 23 and 24 are set in spaced parallel relation and extend at right angles to the band 22 and are formed with their hubs 25 and 26 so that they flex or tend to bend away from each other.

Positioned within the recess 19 are wooden blocks 27 and 28. These blocks are formed semicircular, each being the complementary half of the other to form a ring having the core opening 29 for embracing the hubs 25 and 26 and extending into the recess 19 so as to form a closure for the opening 12. Extending inwardly from the face of opening 29 a groove 30 is formed in each block for receiving the discs 23 and 24. Each of the discs 23 and 24 will firmly press against a respective side wall of the groove 30 or channel to prevent seeping of lubricant thereacross.

The discs 24 and 23 rotate with the axle 11 and their effectiveness in preventing the escape or seepage of lubricant from the casing is not impaired even as the blocks 27 and 28 will tilt relative to the axle due to the rocking of the casing on the crest 17. It will also be noted that the diameter of discs 23 and 24 is smaller than the diameter of opening 12 so as not to interfere with the usual practice of withdrawing the axle 11 through the opening 12 from the casing. The removal of the wooden blocks 27 and 28 through the opening 20 permits an easy and quick separation of the axle from the journal.

What I claim is:

1. A bearing seal of the class described adapted for use with a journal box having a bearing contained therein and provided at one side with a central opening for reception of a shaft projected therethrough into engagement with said bearing, and provided at said side with a recess surrounding said opening and a shaft projected through said opening into said journal box and journaled at one end in said bearing, comprising: a circular band mounted on said shaft in embracing relation thereto at the location of said recess and rotatable in unison with said shaft; a pair of discs each having a central opening formed therethrough and axially turned at the opening to provide a tubular hub, said band being projected through said hubs and fixedly secured thereto, said discs radiating outwardly therefrom in spaced relation to each other, said discs being resilient; a ring embracing said band and positioned in said recess and comprising a pair of semi-circular parts, the inner face of said ring parts being grooved to provide a circular channel having oppositely disposed walls, said discs engaging in said channel and each bearing against the opposed face of one of said walls.

2. A bearing seal of the class described adapted for use with a journal box having a bearing contained therein and provided at one side with a central opening for reception of a shaft projected therethrough into engagement with said bearing, and provided at said side with a recess surrounding said opening and a shaft projected through said opening into said journal box and journaled at one end in said bearing, comprising: a circular band mounted on said shaft in embracing relation thereto at the location of said recess and rotatable in unison with said shaft; a pair of discs each having a central opening formed therethrough and axially turned at the opening to provide a tubular hub, said band being projected through said hubs and fixedly secured thereto, said discs radiating outwardly therefrom in spaced relation to each other, said discs being resilient; a ring embracing said band and positioned in said recess and comprising a pair of semi-circular parts, the inner face of said ring parts being grooved to provide a circular channel having oppositely disposed walls, said discs engaging in said channel and each bearing against the opposed face of one of said walls; said discs being curved in cross-section to provide a concave face and a convex face, the convex face being directed toward the opposed face of a wall.

3. A bearing seal of the class described adapted for use with a journal box having a bearing contained therein and provided at one side with a central opening for reception of a shaft projected therethrough into engagement with said bearing, and provided at said side with a recess surrounding said opening and a shaft projected through said opening into said journal box and journaled at one end in said bearing, comprising: a circular band mounted on said shaft in embracing relation thereto at the location of said recess and rotatable in unison with said shaft; a pair of discs each having a central opening formed therethrough and axially turned at the opening to provide a tubular hub, said band being projected through said hubs and fixedly secured thereto, said discs radiating outwardly therefrom in spaced relation to each other, said discs being resilient; a ring embracing said band and positioned in said recess and comprising a pair of semi-circular parts, the inner face of said ring parts being grooved to provide a circular channel having oppositely disposed walls, said discs engaging in said channel and each bearing against the opposed face of one of said walls; said discs being curved in cross-section to provide a concave face and a convex face, the convex face being directed toward the opposed face of a wall; said discs being of a diameter to terminate radially inwardly from the bottom of said channel.

CHARLES H. WITTHOFFT.

REFERENCES CITED

The following references are of record in the file of this patent:

UNITED STATES PATENTS

| Number | Name | Date |
|---|---|---|
| 618,414 | Harrison | Jan. 21, 1899 |
| 2,377,387 | Stromeier | June 5, 1945 |

FOREIGN PATENTS

| Number | Country | Date |
|---|---|---|
| 19,968 | Great Britain | of 1909 |
| 289,365 | Great Britain | of 1928 |
| 380,215 | Germany | of 1923 |